(12) United States Patent
Kenworthy et al.

(10) Patent No.: US 7,393,093 B2
(45) Date of Patent: Jul. 1, 2008

(54) PROCESS FOR INK JET PRINTING

(75) Inventors: Mark Kenworthy, Manchester (GB); Tom Annable, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 281 days.

(21) Appl. No.: 10/485,570

(22) PCT Filed: Aug. 30, 2002

(86) PCT No.: PCT/GB02/03999

§ 371 (c)(1), (2), (4) Date: Feb. 3, 2004

(87) PCT Pub. No.: WO03/022593

PCT Pub. Date: Mar. 20, 2003

(65) Prior Publication Data

US 2004/0218027 A1 Nov. 4, 2004

(30) Foreign Application Priority Data

Sep. 13, 2001 (GB) ................................. 0122077.1

(51) Int. Cl.
*C09D 11/00* (2006.01)
(52) U.S. Cl. ............................ 347/100; 347/95; 347/99; 347/102; 106/31.13; 106/31.27
(58) Field of Classification Search ................. 347/100, 347/102, 95, 99; 106/31.13, 31.27
See application file for complete search history.

(56) References Cited

U.S. PATENT DOCUMENTS

| 5,725,647 | A | * | 3/1998 | Carlson et al. | ............ | 106/31.86 |
| 6,102,537 | A | * | 8/2000 | Kato et al. | ................... | 347/101 |
| 6,932,466 | B2 | | 8/2005 | Payne et al. | ................. | 347/100 |
| 2003/0116058 | A1 | * | 6/2003 | Hopper er al. | ........... | 106/31.43 |

FOREIGN PATENT DOCUMENTS

| EP | 0291214 A2 | 11/1988 |
| EP | 0679759 A1 | 11/1995 |
| EP | 19527100 A1 | 1/1997 |
| GB | WO200037258 A * | 6/2000 |
| WO | WO 99/54144 | 10/1999 |
| WO | WO 00/03080 | 1/2000 |
| WO | WO 00/37258 | 6/2000 |
| WO | WO 200037574 A1 * | 6/2000 |
| WO | WO 200245971 A1 * | 6/2002 |

* cited by examiner

*Primary Examiner*—Manish S. Shah
*Assistant Examiner*—Laura E Martin
(74) *Attorney, Agent, or Firm*—Morgan, Lewis & Bockius LLP

(57) ABSTRACT

An ink-jet printing process containing the steps (a) and (b) in any order or simultaneously: (a) applying an ink by means of an ink printer to a localised region of substrate to form an image on the substrate; and (b) applying a fixing composition containing a liquid medium and a polymeric biguanide containing a repeat unit of Formula (1) or a salt thereof by means of an ink jet printer to localised region of the substrate: wherein: X and Y are the same or different and represent divalent organic linking groups; and characterised in that the localised regions referred to in steps (a) and (b) are substantially coextensive.

17 Claims, No Drawings

PROCESS FOR INK JET PRINTING

The present invention relates to an ink jet printing process, to fixing compositions, to sets of liquids and to ink jet printer cartridges.

Ink-jet printing (IJP) is a non-impact printing technique in which droplets of ink are ejected through a fine nozzle onto a substrate without bringing the nozzle into contact with the substrate. The images prepared by IJP desirably meet many demanding requirements. For example, they should be sharp and non-feathered and should also exhibit high water-fastness, light-fastness, humidity-fastness and optical density. Ideally the images should not blur or run excessively when a highlighter pen is passed over them. Compositions used in IJP should have good jettability (i.e. low tendency to block the fine nozzles used in ink jet printers).

Increasingly nowadays highlighter pens are used to draw attention to particular parts of documents e.g. important sentences. The pen, usually containing a brightly coloured or fluorescent ink, is drawn by the reader over parts of the document they wish to highlight. A problem with many documents prepared by ink jet printing is that the highlighter can smear the text, making the important part of the document unsightly or even unreadable. Thus there is a need to reduce the extent to which highlighters cause printed text to smear while at the same time ensuring the print is of good quality and has high fastness to other sources of smear such as sweat.

European Patent 0291214 describes an information device for security applications wherein an invisible fixing agent (e.g. a polymeric biguanide) was applied in a localised manner to a substrate and the fixing agent was obscured by over- or under-printing a large area of substrate with an ink. The obscured fixing agent enabled the substrate to carry concealed information which only becomes detectable on e.g. washing of the substrate to selectively remove dye from areas where the fixing agent, was missing. A number of agents could be used to provide the concealed information, including polyhexamethylene biguanide ("PHMB") having a repeat unit of the formula —$(CH_2)_6$—HNC(=NH)NH—C(=NH)NH—.

The use of compositions comprising a binder and certain polymeric biguanides in inkjet printing processes was described in International Patent application WO00/37258. The compositions comprising binder and biguanides were applied to the entire substrate (i.e. not in a localised manner) by various coating, spraying or ink jet printing methods.

The costs of replacement cartridges for ink jet printers can also be significant for small businesses and home users. Ideally ink jet printers should not waste liquids contained in printer cartridges because this burdens users with high consumables costs.

We have now devised a more efficient process for printing images than that described in International Patent Application WO 00/037258. Furthermore, we have surprisingly found that the binder used in the compositions described in International Patent Application WO00/037258 is not necessary. Use of biguanide free from binder surprisingly displays a number of superior properties to those compositions described in International Patent Application WO00/37258. In particular the resultant images have good general wet-fastness and improved resistance to smearing when highlighted using a highlighter pen.

Thus, according to a first aspect of the present invention there is provided an ink-jet printing process comprising the steps (a) and (b) in any order or simultaneously:

(a) applying an ink by means of an ink jet printer to a localised region of a substrate to form an image on the substrate; and (b) applying a fixing composition comprising a liquid medium and a polymeric biguanide comprising a repeat unit of Formula (1) or a salt thereof by means of an ink jet printer to a localised region of the substrate:

Formula (1)

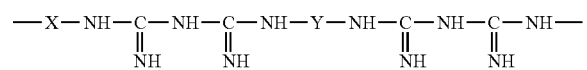

wherein:

X and Y are the same or different and represent divalent organic linking groups; and characterised in that the localised regions referred to in steps (a) and (b) are substantially coextensive.

The ink used in step (a) of the process preferably comprises a liquid medium and a colorant.

Preferred liquid media used in step (a) and/or step (b) include water, a mixture of water and an organic solvent and an organic solvent free from water.

When the liquid medium used in step (a) and/or step (b) comprises a mixture of water and an organic solvent, the weight ratio of water to organic solvent is preferably from 99:1 to 1:99, more preferably from 99:1 to 50:50 and especially from 95:5 to 80:20.

The organic solvent present in the mixture of water and organic solvent is preferably a water-soluble organic solvent or a mixture of such solvents. Preferred water-soluble organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-soluble ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. Nos. 4,963,189, 4,703,113 and 4,626,284.

When the liquid medium used in step (a) and/or step (b) comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-soluble or a mixture of such solvents. Preferred water-soluble organic solvents are any of the hereinbefore described water-soluble organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium used in step (a) and/or step (b) comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

Any colorant suitable for ink-jet printing may be used in the ink. Preferred colorants are pigments which may be organic (including carbon black) or inorganic, disperse dyes and water-soluble dyes.

Preferred pigments are from the azo, disazo, condensed azo, thioindigo, indanthrone, isoindanthrone, anthanthrone, anthraquinone, isodibenzanthrone, triphendioxazine, quinacridone and phthalocyanine series of pigments.

Preferred dyes are azo (preferably monoazo, disazo or trisazo), xanthene, phthalocyanine, triphenodioxazine or triarylmethane dyes. It is especially preferred that the dye(s) are of the azo dyes.

More preferably the colourant comprises a water-soluble azo dye.

The colorant preferably has one or more groups for imparting or assisting water-solubility/dispersibility. Examples of such groups include —COOH, —$SO_3H$, —$PO_3H_2$, morpholinyl and piperazinyl and salts thereof.

When the colorant is a pigment the ink preferably also contains a dispersant to give a stable dispersion of the pigment in the ink. Preferably the particle size of the pigment used in the ink is less than 1 μm.

The ink may contain a single colorant or a mixture of two or more colorants.

The colorant is preferably present in the ink at a concentration of 0.5 to 20 parts, more preferably from 1 to 15 parts and especially from 1 to 5 parts by weight based upon 100 parts total weight of the ink.

The ink may also contain additional components conventionally used in ink-jet printing inks, for example viscosity and surface tension modifiers, corrosion inhibitors, additives to prevent paper curl, biocides, kogation reducing additives, dispersants and surfactants which may be ionic or non-ionic.

In a preferred embodiment of the present invention the colorant has an overall negative charge when incorporated into the liquid medium.

Examples of particularly favoured colourants are described in European Patent 356 080, European Patent 468 647, European Patent 679 173, European Patent 559 309. European Patent 0 628 088.

In view of the forgoing preferences particularly preferred ink comprises:
(a) from 0.5 to 20 parts of a pigment or a water-soluble dye;
(b) from 50 to 98 parts water; and
(c) from 2 to 50 parts of water-soluble organic solvent(s);

wherein all parts are by weight and the sum of the parts (a)+(b)+(c)=100.

Preferably the ink and the fixing composition contain less than 500 ppm, more preferably less than 250 ppm, especially less than 100 pm, more especially less than 10 ppm in total of divalent and trivalent metal ions. The content of halide ions in the ink is preferably below 500 ppm. 'ppm' means parts per million by weight relative to the total weight of ink.

Preferably the ink and the fixing composition have been filtered through a filter having a mean pore size below 10 μm, more preferably below 3 μm, especially below 2 μm, more especially below 1 μm. This filtration removes particulate matter that could otherwise block the fine nozzles used in many ink-jet printers.

The image can be any desired image, for example text, logos, icons or digital photographs to mention just a few.

The reasons for the localised regions referred to in steps (a) and (b) being substantially coextensive are because if the ink is applied to a significantly larger area than the fixer then some of the print will not benefit from improved fixation, leading to smearing and lower wet-fastness. On the other hand, if the fixer is applied to a significantly larger area than the ink (e.g. to the entire substrate as described in International Patent Application WO 00/37258) this is wasteful because the fixer is not needed in some of the areas to which it has been applied and it can lead to unwanted fixation of dirt from a users hand and spilled beverages such as tea and coffee, resulting in excessive staining of printed substrates.

Preferably the localised regions referred to in steps (a) and (b) are coextensive to the extent of at least 80%, more preferably at least 90%, especially 95 to 100% of the total area printed with the ink and fixing composition.

The substrate is preferably paper, plastic, a textile, metal or glass, more preferably paper or a plastic film (especially a transparent film, for example an overhead projector slide). It is especially preferred that the substrate is paper, a textile or a transparent film.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

Preferred plastic films are transparent polymeric films, especially those suitable for use as overhead projector slides, for example polyesters (especially polyethylene terephthalate), polycarbonates, polyimides, polystyrenes, polyether sulphones, cellulose diacetate and cellulose triacetate films.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

In step (b) in the repeat unit of Formula (1) X and Y are each independently optionally interrupted alkylene, more preferably optionally interrupted $C_{2-12}$-alkylene and especially $C_{4-6}$-alkylene; arylene, more preferably $C_{6-10}$-arylene, especially phenylene; and aralkylene, more preferably $C_{7-11}$-aralkylene, especially benzylene or xylylene.

When X and Y are interrupted alkylene, they are preferably interrupted by —O—, —S—, —NH—, —C(=O)— or phenylene.

Examples of preferred alkylene groups represented by X and Y include —(CH$_2$)$_6$—, —(CH$_2$)$_8$—, —CH$_2$CH(—)(CH$_2$)$_4$CH$_3$, 1,4-2,3- and 1,3-butylene, 2,5-hexylen, 2,7-heptylene and 3-methyl-1,6-hexylene.

Examples of preferred interrupted alkylene groups represented by X and Y include —CH$_2$C$_6$H$_4$CH$_2$—, —CH$_2$OC$_6$H$_4$OCH$_2$—, —CH$_2$OC$_6$H$_{10}$OCH$_2$—, —(CH$_2$)$_3$O(CH$_2$)$_3$— and —(CH$_2$)$_2$S(CH$_2$)$_2$—.

It is especially preferred that X and Y are independently each $C_{4-6}$-alkylene. It is more especially preferred that X and Y are both hexylene.

The nature of the terminating groups on the polymeric biguanide is not believed to be critical. However, preferred terminating groups include acyl, more preferably CH$_3$CO; H; optionally substituted alkyl, more preferably optionally substituted $C_{1-10}$alkyl; acyloxy, preferably —OC(O)(C$_{1-4}$-alkyl); halo more preferably F or Cl; cyano; optionally substituted amino; a group of the formula:

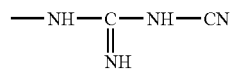

and optionally substituted phenyl. Preferred optional substituents on the terminating groups include $C_{1-4}$alkyl, halo (especially Cl), nitro and $C_{1-4}$-alkoxy (especially methoxy). The terminating group at each end of the polymer may be the same or different.

The polymeric biguanide is typically in the form of a mixture of polymer chains, many or all of which are of different lengths. Preferably, the number of individual biguanide units in a polymer chain:

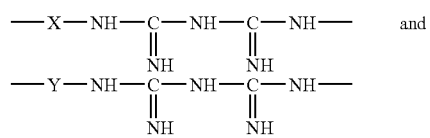

taken together, is from 3 to about 80.

In view of the foregoing preferences the polymeric biguanide preferably comprises one or more poly(hexamethylene biguanide) polymer chains in which the individual polymer chains, excluding the terminating groups, are of Formula (2) and salts thereof:

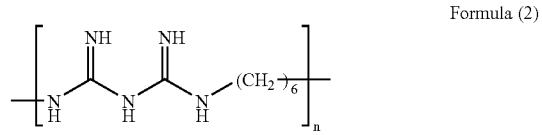

Formula (2)

wherein:
n is from 2 to 40.
n is preferably from 2 to 30, more preferably from 4 to 15.
When the polymeric biguanide is a mixture of poly(hexamethylene biguanide) polymer chains of the Formula (8) it is especially preferred that the average value of n in the mixture is 12.

Preferably, the number average molecular weight of the polymeric biguanide is from 1100 to 3300.

Preferably the polymeric biguanide is in the form of a salt. Preferred salts are those with organic or inorganic acids, especially water-soluble salts, for example the hydrochloride, gluconate or acetate salt.

The polymeric biguanides may be prepared by the reaction of a bisdicyandiamide of the formula:

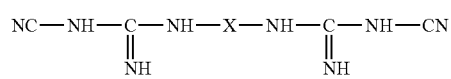

with a diamine of the formula H$_2$N—Y—NH$_2$; or by reaction between a diamine salt of dicyanimide having the formula:

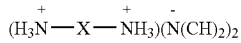

with a diamine of the formula $H_2N$—Y—$NH_2$ wherein X and Y are as hereinbefore defined. These methods of preparation are described in more detail in GB 702,268 and GB 1,152,243 and any of the polymeric biguanides described therein may be used in the present invention.

The polymeric biguanide is preferably colourless, or substantially colourless.

Preferably the ink jet printer used in step (b) is the same ink-jet printer as that used in step (a).

Preferably the fixing composition and ink are applied in "one pass", that is the ink and fixing composition are applied during one pass of the printing head(s) over the substrate.

The fixing composition is preferably applied to the substrate just prior to, or simultaneously with, application of the ink to the substrate. More preferably the fixing composition is applied to the substrate less than 500 milliseconds (ms) prior to the ink. It is especially preferred that the fixing composition is applied to the substrate less than 100 ms prior to the ink.

The ink-jet printer preferably applies the ink (and optionally the fixing composition) to the substrate in the form of droplets which are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application 00/48938 and International Patent Application 00/55089.

Preferably the inkjet printer used to apply the ink and fixing composition has a nozzle or a series of nozzles in the printer that are dedicated to the application of the fixing composition. Thus the ink-jet printer may be of the 'five pen' type in which yellow, magenta, cyan and black are applied by four pens and the fixing composition is applied by a fifth pen. A suitable ink-jet printer and a method for its control is described in European Patent 657 849.

The fixing composition is applied to the substrate in substantially the same localised region as the ink. Thus, the ink-jet printer applies the fixing composition only in that region of the substrate where the ink has formed an image.

Preferably a drop of ink applied in step (a) either before, after or simultaneously with the fixing composition applied in step (b) lies within the boundaries of the spread drop of the fixing composition.

By limiting the distribution of the fixing agent to the immediate area of the image the possibility of unwanted stains (e.g. tea or coffee) being bound to the recording sheet by the fixing agent is minimised. Cost savings are also achieved since the amount of fixing agent required is reduced.

Preferably the process is free from steps in which the dye is removed from the substrate after printing e.g. to form a detectable image.

Application of the fixing agent by means of a 'fifth' pen also has the advantage that printing and fixing can be achieved in one operation and allows the user to easily adjust the level of fixing agent used with different substrates and inks so that optimum performance is achieved.

Preferably the fixing composition in step (b) is free from binders. Binders that are preferably absent from the composition are illustrated by polymeric binders, for example water-soluble or water-dissipatable polymeric binder and hydrophobic binders. Preferred water-soluble binders include starches, preferably hydroxy alkyl starches, for example hydroxyethylstarch; celluloses, for example celluslose, methylcellulose, hydroxyethylcellulose, hydroxypropylcellulose, hydroxyethyl methyl cellulose, carboxymethlycellulose (and salts thereof) and cellulose acetate butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly (vinylpyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth)acrylate monomers; amine-functional acrylic polymers and copolymers, for example polydimethylaminoethylmethacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride); polyesters, preferably those which carry water-solubilising groups, especially sulphonic acid groups, for example polyesters obtainable by polymerising a polyol with sodiosulphoisophthalic acid.

Binders have a high boiling point (e.g. above 200° C.) allowing them to remain on the substrate after the fixing composition has dried. Thus in another preferred embodiment the fixing composition in step (b) is free from materials having a boiling point above 200° C. at atmospheric pressure, other than the biguanide.

It is to be understood that in all embodiments of the present invention the terms "ink", "colorant" and "polymeric biguanide" extend to two or more of these materials respectively as well as one of them.

A preferred fixing composition suitable for use in step (b) comprises:

(a) from 0.1 to 10 parts of a polymeric biguanide;
(b) from 10 to 60 parts of a water-soluble organic solvent; and
(c) from 35 to 85 parts water, wherein all parts are by weight and the total number of parts (a)+(b)+(c)=100.

Preferred water-soluble organic solvents used in the fixing composition are as described above in relation to liquid media for inks.

When the fixing composition is applied to the substrate by means of an ink-jet printer the composition preferably has a viscosity of less than 20 cP at 25° C.

Preferably the fixing composition is transparent or colourless when dry.

The prints obtained using the process exhibit low colour bleed, high print quality and, in many cases, higher lightfastness compared to prints prepared without the polymeric biguanide. Furthermore, the application of the fixing agent free from binder does not markedly affect the shade or hue of the ink and does not result in the discoloration of the printed substrate. The absence of binder results is a cheaper fixing composition with improved highlight smear and water-fastness properties.

According to a second aspect of the present invention there is provided a substrate printed with an image by means of a process according to the first aspect of the invention. The preferred substrates are as hereinbefore defined in relation to the first aspect of the present invention.

According to a third aspect of the present invention there is provided a fixing composition comprising an aqueous medium and a polymeric biguanide as described in the first aspect of the invention, characterised in that the composition is free from binder, has been filtered through a filter having a mean pore size below 10 µm and contains less than 500 ppm total of divalent and trivalent metal ions.

Preferably the composition according to the third aspect of the invention has been filtered through a filter having a mean pore size below 3 µm, more preferably below 2 µm, especially below 1 µm.

It is also preferred that the composition according to the third aspect of the invention contains less than 250 ppm, more preferably less than 100 ppm, especially less than 10 ppm total of divalent and trivalent metal ions.

The preferred polymeric biguanides and water-soluble organic solvents are as hereinbefore defined in the first aspect of the present invention.

According to a fourth aspect of the present invention there is provided a set of liquids suitable for use in an ink-jet printer comprising:
(a) a first liquid which is an ink comprising a colorant and a liquid medium; and
(b) a second liquid which is a fixing composition comprising:
  (i) 0.01 to 50 parts, more preferably 0.1 to 30 and especially from 0.1 to 10 parts of a polymeric biguanide as defined in the first aspect of the invention; and
  (ii) 50 to 99.8, more preferably 60 to 80 parts of a liquid medium preferably selected from water, one or more water-soluble organic solvents and a mixture of water and one or more water-soluble organic solvents;

wherein all parts are by weight and the total number of parts (i)+(ii)=100; and characterised in that the second liquid is free from binders.

The ink in the set of liquids according to the fourth aspect of the present invention is preferably as described above in relation to the first aspect of the present invention The preferred polymeric biguanides, colorants and Water-soluble organic solvents in the ink set according to the fourth aspect of the present invention are as hereinbefore defined in the first aspect of the present invention.

The set according to the fourth aspect of the present invention is preferably housed in an ink-jet printer, i.e. the invention also provides an ink-jet printer comprising a printing mechanism and a set of liquids as defined in the third aspect of the present invention. Each of the liquids may be contained in one or more than one cartridge present in an ink-jet printer.

A fifth aspect of the invention provides an ink-jet printer cartridge comprising a plurality of chambers and a set of liquids, wherein the liquids are contained in individual chambers of the ink-jet printer cartridge and the set of liquids is as defined in the fourth aspect of the invention.

The invention also provides an ink-jet printer cartridge comprising a plurality of chambers and a fixing composition, wherein the fixing composition is contained in the chamber of the ink-jet printer cartridge and the fixing composition is as defined in the first and third aspects of the invention.

The invention is further illustrated by the following examples in which all parts and percentages are by weight unless specified otherwise.

In these Examples the following abbreviations are used:
PHMB hydrochloride is poly(hexamethylene biguanide), obtained from
Avecia Limited as Vantocil™ IB (a 18% solution in water);
PEI is Polyethyleneimine, obtained from BASF as Lupasol™ FG;
Fast Magenta 2 is a dye obtained from Avecia Limited, Manchester, England.
PVOH is polyvinyl alcohol of molecular weight 13000-23000, 87-89% hydrolysed, obtained from Aldrich Chemical Co. (PVOH is a binder).

EXAMPLE 1

The following ink and fixing compositions were prepared as follows:

| Ink Formulation: | |
| --- | --- |
| Fast Magenta 2 | 3% |
| 2-Pyrrolidinone | 9% |
| Thiodiethylene glycol | 9% |
| Cyclohexanol | 2% |
| Deionised Water | 77% |

The pH of the ink was adjusted to pH 8.0 with 1 M sodium hydroxide.

| | Fixing Compositions | |
| --- | --- | --- |
| | Fixing Composition 1 | Comparative Fixer A |
| PHMB | 5% | |
| PEI | | 5% |
| 2-Pyrrolidinone | 9% | 9% |
| Thiodiethylene glycol | 9% | 9% |
| Cyclohexanol | 2% | 2% |
| Deionised Water | 75% | 75% |

The pH of each fixing composition was adjusted to pH 4.0 using 1M nitric acid or 1M sodium hydroxide.

The fixing compositions were placed in the cyan compartment of an empty colour ink cartridge, and the ink was placed into the yellow chamber of the same cartridge. The cartridge was loaded into an Olivetti 102 ink jet printer and the fixing composition was printed onto Xerox Acid paper before the ink. In Example 1 the print was under-printed with Fixer 1, in Comparative Example A the print was under-printed with Fixer A and in Comparative Example B no fixing composition was applied.

Print Evaluation

Wet-Fastness Assessment

The paper printed with the inks in a pattern of parallel bars was attached to a support at a 45° angle such that the parallel bars were in a horizontal direction. A pipette was then used to dispense 0.5 ml of distilled water (pH 6-7) onto the print at a position slightly above the top of the parallel bars, taking care to ensure the run down of water over the print was as close as possible to a right angle to the printed bars.

After allowing the print to dry the average reflected optical density of the stained area between printed bars 4 to 6 ("OD Stained") and the average reflected optical density of the unprinted, unstained areas ("Background OD") were measured using an X rite Spectrodensitometer. The extent to which the water caused the prints to run into the unprinted area (i.e. the "Run Down") was calculated by the equation:

Run Down=(OD Stained−Background OD)

A low value of Run Down indicates high water-fastness for the print.

Highlighter Smear

Paper was printed as described above for the wet-fastness assessment. Highlighter smear tests were performed 24 hours after printing using a Stabilo Boss yellow highlighter "Stabilohighlighter", and a Sanford Major Accent yellow highlighter "Sanford highlighter". The tests were performed by drawing the highlighter twice over unprinted areas of the paper and then twice over a printed bar and the adjacent unprinted area. The average reflected optical density was measured for unprinted areas of the paper where the highlighter pen had been drawn over twice ("Background OD"). Additionally the average reflected optical density was measured for areas of the paper adjacent to printed areas where the highlighter had been drawn over twice ("OD Smeared"). The extent to which the highlighter pen caused the prints to smear into the unprinted area of the paper (i.e. the "Highlighter Smear") was calculated by the equation:

Highlighter Smear=(OD Smeared−Background OD).

The results of the Run Down and Highlighter Smear tests are shown in the Table 1 wherein lower values indicate better wet-fastness and lower Highlighter Smear as the case may be.

TABLE 1

| Example | Example 1 | Comparative Example A | Comparative Example B |
|---|---|---|---|
| Fixing Composition | PHMB | PEI | None |
| Run Down | 0.002 | 0.001 | 0.08 |
| Stabilo Highlighter Smear | 0.02 | 0.04 | 0.06 |
| Sanford Hightighter Smear | 0.03 | 0.2 | 0.08 |

The results show that using PHMB as under-printing fixer results in less Run Down (i.e. higher water fastness) than when no fixing agent is used. Furthermore, PHMB results in less Highlighter Smear than with either the comparative Example A (PEI) or B (no fixing agent).

EXAMPLES 2 AND 3

The following fixing compositions were prepared:

TABLE 2

| | Fixing Composition 2 | Fixing Composition 3 | Comparative Fixer C | Comparative Fixer D |
|---|---|---|---|---|
| PHMB | 5% | 2.5% | 5% | 2.5% |
| PVOH (binder) | | | 2.5% | 2.5% |
| 2-Pyrrolidinone | 9% | 9% | 9% | 9% |
| Thiodiethylene glycol | 9% | 9% | 9% | 9% |
| Cyclohexanol | 2% | 2% | 2% | 2% |
| Deionised Water | 75% | 77.5%% | 72.5% | 75% |

The pH of each fixing composition was adjusted to pH 4.0 using 1M nitric acid or 1M sodium hydroxide.

The fixing compositions were placed in the cyan compartment of an empty colour ink cartridge, and the ink was placed into the yellow chamber of the cartridge. The cartridges were loaded into an Olivetti 192 printer and the fixing composition was printed onto Weyerhauser First Choice paper before the ink. In Examples 2 and 3 and comparative Examples C and D the print was under-printed with Fixer 2 and 3 and comparative Fixers C and D respectively. In comparative Example E no fixer was used.

Wet-Fastness and Highlighter Smear

The Run Down and Highlighter Smear evaluation tests were performed in an analogous manner to that described in Example 1 and the results are shown in Table 3 below. Print quality was examined visually and given a score of 0 to 5 with 5 being perfect quality and 0 being poor quality.

TABLE 3

| Example | Example 2 | Example 3 | Comparative Example C | Comparative Example D | Comparative Example E |
|---|---|---|---|---|---|
| Fixer | 5% PHMB | 2.5% PHMB | 5% PHMB 5% PVOH | 2.5% PHMB 5% PVOH | None |
| Run Down | 0.01 | 0.04 | 0.207 | 0.198 | 0.2 |
| Stabilo Highlighter Smear | 0.01 | 0.02 | 0.06 | 0.1 | 0.06 |

TABLE 3-continued

| Example | Example 2 | Example 3 | Comparative Example C | Comparative Example D | Comparative Example E |
|---|---|---|---|---|---|
| Sanford Highlighter Smear | 0.04 | 0.1 | 0.1 | 0.1 | 0.08 |
| Print Quality (0-5) | 5 | 5 | 2 | 3 | 5 |

The results described in Table 3 show that the use of a PHMB in fixing compositions (Examples 2 and 3) reduces Run Down (i.e. improves wet-fastness) and reduces Highlighter Smear compared to when no PHMB is included, particularly in binderless fixing compositions. Furthermore, omission of the binder results in improved print quality compared to when the binder is present.

The invention claimed is:

1. An ink-jet printing process comprising the steps (a) and (b) in any order or simultaneously:
    (a) applying an ink by means of an ink jet printer to a localised region of a substrate to form an image on the substrate; and
    (b) applying a fixing composition comprising a liquid medium and a polymeric biguanide comprising a repeat unit of Formula (1) or a salt thereof by means of an ink jet printer to a localised region of the substrate:

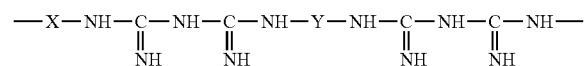

Formula (1)

wherein:
    X and Y are the same or different and represent divalent organic linking groups; and characterised in that the localised regions referred to in steps (a) and (b) are substantially coextensive and wherein the fixing composition in step (b) is free from binders.

2. A process according to claim 1 wherein X and Y are independently each $C_{4-8}$-alkylene.

3. A process according to claim 1 wherein X and Y are both hexylene.

4. A process according to claim 1 wherein the polymeric biguanide comprises one or more poly(hexamethylene biguanide) polymer chains in which the individual polymer chains, excluding the terminating groups, are of Formula (2) and salts thereof:

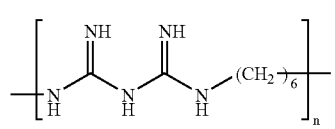

Formula (2)

wherein:
    n is from 2 to 40.

5. A process according to claim 1 which is free from steps in which the dye is removed from the substrate after printing.

6. A process according to claim 1 wherein the ink-jet printer is of the 'five pen' type in which yellow, magenta, cyan and black are applied by four pens and the fixing composition is applied by a fifth pen.

7. A process according to claim 1 wherein in a drop of ink applied in step (a) either before, after or simultaneously with the fixing composition applied in step (b) lies within the boundaries of the spread drop of the fixing composition.

8. A process according to claim 1 wherein the fixing composition in step (b) comprises:
    (a) from 0.1 to 10 parts of a polymeric biguanide;
    (b) from 10 to 60 parts of a water-soluble organic solvent; and
    (c) from 35 to 85 parts water;
    wherein all parts are by weight and the total number of parts (a)+(b)+(c)=100.

9. A process according to claim 1 wherein the fixing composition in step (b) is free from materials having a boiling point above 200° C. at atmospheric pressure other than the biguanide.

10. A substrate printed with an image by means of a process according to claim 1.

11. A fixing composition comprising an aqueous medium and a polymeric biguanide as described in claim 1, characterised in that the composition is free from binder, has been filtered through a filter having a mean pore size below 10 μm and contains less than 500 ppm total of divalent and trivalent metal ions.

12. A set of liquids suitable for use in an ink-jet printer comprising:
    (a) a first liquid which is an ink comprising a colorant and a liquid medium; and
    (b) a second liquid which is a fixing composition comprising:
        (i) 0.01 to 50 parts of a polymeric biguanide comprising a repeat limit of Formula (1) or a salt thereof

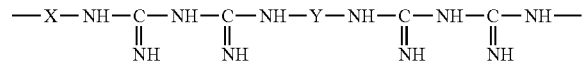

Formula (1)

wherein:
    X and Y are the same or different and represent divalent organic linking groups; and
    (ii) 50 to 99.8 parts of a liquid;
wherein all parts are by weight and the total number of parts (i)+(ii)=100; and characterised in that the second liquid is free from binders.

13. An ink-jet printer cartridge comprising a plurality of chambers and a set of liquids, wherein the liquids are contained in individual chambers of the ink-jet printer cartridge and the set of liquids is according to claim 12.

14. An ink-jet printer cartridge comprising a plurality of chambers and a fixing composition, wherein the fixing composition is contained in the chamber of the ink-jet printer cartridge and the fixing composition comprises a liquid medium and a polymeric biguanide comprising a repeat unit of Formula (1) or a salt thereof;

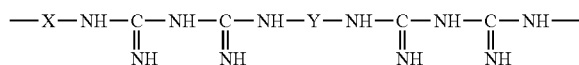

Formula (1)

wherein:

X and Y are the same or different and represent divalent organic linking groups; and the fixing composition is free from binders.

15. An ink-jet printing process according to claim 1 wherein the ink is not applied to a significantly larger area than the fixing composition and the fixing composition is not applied to a significantly larger area than the ink.

16. An ink-jet printing process according to claim 1 wherein the localised regions referred to in steps (a) and (b) are coextensive to the extent of at least 80% of the total area printed with the ink and fixing composition.

17. An ink-jet printing process according to claim 1 which is such that the fixing composition is applied only to the region where the ink forms an image.

* * * * *

UNITED STATES PATENT AND TRADEMARK OFFICE
CERTIFICATE OF CORRECTION

PATENT NO. : 7,393,093 B2  Page 1 of 1
APPLICATION NO. : 10/485570
DATED : July 1, 2008
INVENTOR(S) : Mark Kenworthy et al.

It is certified that error appears in the above-identified patent and that said Letters Patent is hereby corrected as shown below:

Title Page
(75) Inventors should read: Mark Kenworthy, Manchester (GB);
Philip MacFaul, Manchester (GB);
Tom Annable, Manchester (GB)

Signed and Sealed this

First Day of June, 2010

David J. Kappos
*Director of the United States Patent and Trademark Office*